United States Patent
Bui et al.

(10) Patent No.: US 7,529,061 B2
(45) Date of Patent: May 5, 2009

(54) TAPE DRIVE FOR MAINTAINING LATERAL POSITION UTILIZING LONGITUDINALLY SHIFTED SERVO PATTERN WITH INCREASED SAMPLING RATE

(75) Inventors: Nhan Xuan Bui, Tucson, AZ (US); Reed Alan Hancock, Tucson, AZ (US); Eiji Ogura, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/024,129

(22) Filed: Feb. 1, 2008

(65) Prior Publication Data

US 2008/0117543 A1 May 22, 2008

(51) Int. Cl.
*G11B 5/584* (2006.01)

(52) U.S. Cl. .................................... 360/77.12

(58) Field of Classification Search .............. 360/77.12, 360/48, 75, 64, 72.2, 73.04, 53, 121; 714/771
See application file for complete search history.

(56) References Cited

U.S. PATENT DOCUMENTS

| | | | |
|---|---|---|---|
| 4,530,012 A | 7/1985 | Kinjo | 358/327 |
| 4,783,705 A | 11/1988 | Moon et al. | 360/77 |
| 4,912,576 A | 3/1990 | Janz | 360/77.07 |
| 5,115,360 A | 5/1992 | Sidman | 360/77.08 |
| 5,689,384 A | 11/1997 | Albrecht et al. | 360/77.12 |
| 5,930,065 A | 7/1999 | Albrecht et al. | 360/72.2 |
| 6,031,673 A * | 2/2000 | Fasen et al. | 360/53 |
| 6,111,719 A * | 8/2000 | Fasen | 360/73.04 |
| 6,169,640 B1 | 1/2001 | Fasen | 360/48 |

(Continued)

OTHER PUBLICATIONS

Allen Keith Bates, et al., 'Multiple Servo Sensor Configuration for Magnetic Tape Timing Based Servo'; pp. 1-29 (includes 7 pages of figures), U.S. Appl. No. 11/535,328, filed Sep. 26, 2006.

(Continued)

*Primary Examiner*—Fred Tzeng (57) ABSTRACT

A tape drive and a method of using a tape drive is provided. The tape drive includes a head assembly including at least a first and a second servo read element configured to detect transition stripes of a servo pattern on tape media. The first servo read element is configured to detect at least two transition stripes of an even servo band on the tape media at a first time. The servo detection logic is configured to detect a timing of at least two transition stripes of the even servo band on the tape media. The servo controller is configured to position the head assembly laterally with respect to the tape media in response to the timing of the at least two transition stripes of the even servo band on the tape media. The second servo read element is configured to detect at least two transition stripes of an odd servo band on the tape media at a second time, wherein the second time is a time delay after the first time corresponding to a distance D. The servo detection logic is further configured to detect a timing of at least two transition stripes of the odd servo band on the tape media. The servo controller further is configured to position the head assembly laterally with respect to the tape media in response to the timing of the at least two transition stripes of the odd servo band on the tape media.

25 Claims, 6 Drawing Sheets

U.S. PATENT DOCUMENTS

| | | | |
|---|---|---|---|
| 6,278,571 B1 | 8/2001 | Bui et al. | 360/77.12 |
| 6,310,747 B1 | 10/2001 | Emo et al. | 360/97.02 |
| 6,580,581 B1 | 6/2003 | Bui et al. | 360/78.02 |
| 6,606,216 B1 | 8/2003 | Liikanen et al. | 360/77.08 |
| 6,754,033 B1* | 6/2004 | Argumedo et al. | 360/77.12 |
| 6,791,781 B2* | 9/2004 | Bui et al. | 360/72.2 |
| 6,937,413 B2 | 8/2005 | Bui et al. | 360/48 |
| 6,963,467 B2* | 11/2005 | Bui et al. | 360/77.12 |
| 7,002,763 B2* | 2/2006 | Bui et al. | 360/48 |
| 7,095,583 B2 | 8/2006 | Johnson et al. | 360/77.12 |
| 7,102,847 B2* | 9/2006 | Bui et al. | 360/77.12 |
| 7,167,329 B2 | 1/2007 | Baker | 360/55 |
| 7,170,702 B2* | 1/2007 | Ohtsu | 360/48 |
| 7,259,930 B2* | 8/2007 | Ohtsu | 360/73.04 |
| 7,421,640 B2* | 9/2008 | Cideciyan et al. | 714/771 |
| 2005/0286158 A1* | 12/2005 | Bui et al. | 360/77.12 |
| 2005/0286159 A1* | 12/2005 | Bui et al. | 360/77.12 |
| 2005/0286160 A1* | 12/2005 | Bui et al. | 360/77.12 |
| 2008/0117539 A1* | 5/2008 | Bui et al. | 360/48 |
| 2008/0117542 A1* | 5/2008 | Bui et al. | 360/77.12 |
| 2008/0273264 A1* | 11/2008 | Biskeborn et al. | 360/121 |

OTHER PUBLICATIONS

Nhan X. Bui, et al., 'Method and System for Providing a Longitudinally Shifted Servo Pattern for Increased Sampling Rate'; pp. 1-38 (includes 7 pages of figures), U.S. Appl. No. 12/024,125, filed Feb. 1, 2008.

Nhan X. Bui, et al., 'Tape Cartridge Having Tape Media With Longitudinally Shifted Servo Pattern for Increased Sampling Rate'; pp. 1-31 (includes 6 pages of figures), U.S. Appl. No. 12/024,127, filed Feb. 1, 2008.

* cited by examiner

TAPE DRIVE FOR MAINTAINING LATERAL POSITION UTILIZING LONGITUDINALLY SHIFTED SERVO PATTERN WITH INCREASED SAMPLING RATE

DOCUMENT INCORPORATED BY REFERENCE

Commonly assigned U.S. Pat. No. 5,689,384 is incorporated for its showing of a timing based servo system.

FIELD OF THE INVENTION

This invention relates to servoing for magnetic tape, and more particularly, to servoing for magnetic tape having timing based servo band(s) extending in the longitudinal direction of the magnetic tape.

BACKGROUND OF THE INVENTION

Magnetic tape provides a means for physically storing data which may be archived or which may be stored in storage shelves of automated data storage libraries and accessed when required. The reading and/or writing of data in bands on magnetic recording tape requires precise positioning of a magnetic head. The magnetic head must be moved to, and maintained centered over, specific longitudinal data bands, as the magnetic tape is moved longitudinally past the magnetic head. The magnetic head is translated between bands in a lateral direction with respect to the longitudinal data bands.

A servo system is employed to move the magnetic head to and position the magnetic head in the center of the desired data band or bands, and to track follow the center of the desired data band or bands. The data bands are becoming increasingly smaller and closer together in order to increase the data band density and thereby increase data capacity of a given tape. Hence, it has become desirable to place the longitudinal defined servo bands at various locations across the full width of the tape, separated by groups of data bands. This allows the servo bands to be close to the data bands and limits offsets due to tape stretch, etc. This also allows a greater number of bands to be employed due to the greater precision of the relationship between the servo bands and the data bands.

SUMMARY OF THE INVENTION

A magnetic tape drive and a method of using a magnetic tape drive is provided. The magnetic tape drive includes a head assembly comprising a plurality of servo read elements including at least a first and a second servo read element configured to detect transition stripes of a servo pattern on magnetic tape media. The servo pattern includes a plurality of parallel longitudinal servo bands that lie between a plurality of longitudinal data bands. The plurality of servo bands include odd servo bands and even servo bands, and each of the odd servo bands lie between the each of the even servo bands. Each servo band includes a plurality of frames, and each frame includes a plurality of bursts of transition stripes. Each burst has a first transition stripe. The first transition stripe of each burst of each odd servo band is longitudinally shifted from the first transition stripe of each burst of each even servo band by a substantially equal distance, D, such that servo information of the odd servo bands is interleaved with servo information from the even servo bands.

The first servo read element of the tape drive is configured to detect at least two transition stripes of the even servo band on the magnetic tape media at a first time. The servo detection logic configured to detect a timing of the at least two transition stripes of the even servo band on the magnetic tape media. The servo controller is configured to position the head assembly laterally with respect to the magnetic tape media in response to the timing of the at least two transition stripes of the even servo band on the magnetic tape media.

The second servo read element is configured to detect at least two transition stripes of the odd servo band on the magnetic tape media at a second time, wherein the second time is a time delay after the first time corresponding to the distance D. The servo detection logic is further configured to detect a timing of the at least two transition stripes of the odd servo band on the magnetic tape media. The servo controller is further configured to position the head assembly laterally with respect to the magnetic tape media in response to the timing of the at least two transition stripes of the odd servo band on the magnetic tape media.

In one embodiment the plurality of read elements are further configured to detect transition stripes of the servo pattern wherein each frame of the plurality of frames further includes a first burst of transition stripes in a first azimuthal orientation and a second burst of transition stripes in a second azimuthal orientation different than the first azimuthal orientation, followed by a third burst of transition stripes in the first azimuthal orientation and a fourth burst of transition stripes in the second azimuthal orientation and wherein a distance between the first transition stripe of the first burst and the first transition stripe of the third burst is a distance B.

In one embodiment the plurality of servo read elements are configured to detect transition stripes of the servo pattern wherein the first transition stripe of each burst of each the odd servo band is longitudinally shifted from the first transition stripe of each burst of each the even servo band by a substantially equal distance, D, wherein $$0.9 \frac{B}{X} \leq D \leq 1.1 \frac{B}{X}$$

and wherein X is defined as a number of servo read elements of the plurality of servo read elements.

Accordingly, in one embodiment, the tape drive has two servo read elements such that $0.45B \leq D \leq 0.55$. In another embodiment the tape drive has three servo read elements such that $0.30B \leq D \leq 0.37B$.

In one embodiment the time delay is a product of distance, D, and a velocity of the magnetic tape media.

In one embodiment the tape drive includes a magnetic read/write tape head configured to read and write data on the magnetic tape media. In one embodiment the first and second servo read elements are laterally spaced apart. The plurality of read elements are further configured to detect transition stripes of the servo pattern the frame further includes a first burst of a group of five stripes in a first azimuthal orientation and a second burst of a group of five transitions in a second azimuthal orientation different than the first azimuthal orientation, followed by a third burst of a group of four transition stripes in the first azimuthal orientation and a fourth burst a group of four transition stripes in the second azimuthal orientation. In one embodiment the second azimuthal orientation is opposite of the first azimuthal orientation.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Figure 1:
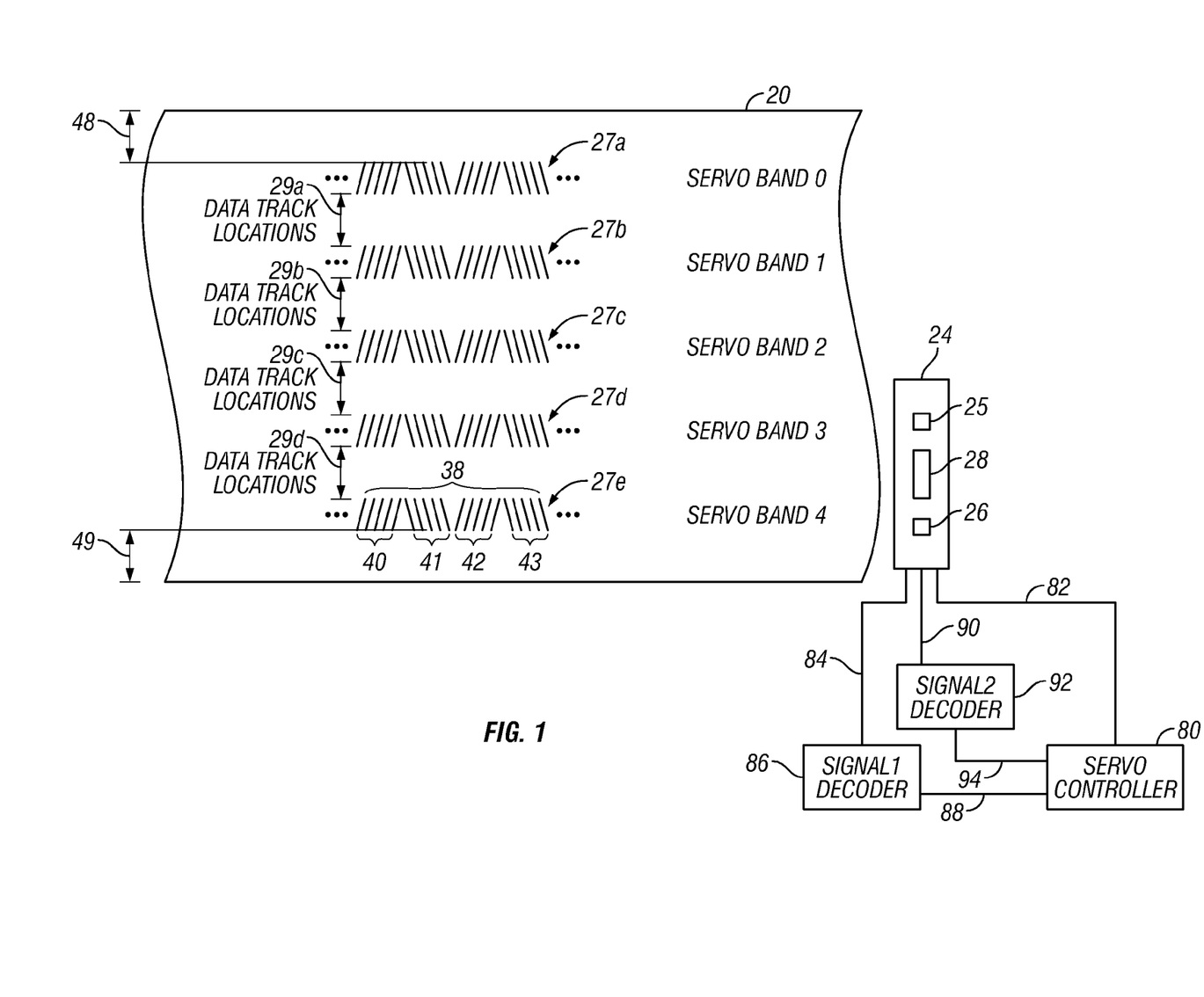
FIG. 1 is a diagrammatic illustration of a magnetic tape having a timing based servo track, and of a magnetic head and servo system of a magnetic tape drive having multiple servo read elements.

Referring to FIG. 1, a timing based servo pattern is described on a magnetic tape, such as magnetic tape 20 wherein prerecorded magnetic parallel longitudinal servo bands 27 (e.g. 27a, 27b, 27c, 27d, and 27e) lie between groups of longitudinal data tracks 29 (e.g. 29a, 29b, 29c, 29d, and 29e). In addition, the magnetic tape 20 is provided with guard bands 48, 49 at the edges of the tape. The longitudinal direction is defined as the direction along the length of the magnetic tape 20. The lateral direction is defined as the direction along the width of the magnetic tape 20 and is perpendicular to the longitudinal direction. The terms "band" and "track" are used interchangeably herein. Similarly, the terms "bands" and "tracks" are used interchangeably herein.

In the specific example of FIG. 1, five longitudinal timing based defined servo bands 27 are prerecorded on a magnetic tape 20 for track following at these positions. The pattern of magnetic transitions recorded in the defined servo bands is a repeated set of frames 38, each of which are of different azimuthal orientations. For example, the pattern may comprise transitions slanted, or having an azimuthal orientation, in a first direction with respect to the longitudinal direction of the linear servo track, alternating with transitions having different slants, for example, in the opposite direction. The groups of transitions having the same azimuthal orientation and separated by gaps or spaces are referred to as "servo bursts" or simply as "bursts" (e.g. bursts 40, 41, 42, and 43). Each servo burst contains a predetermined number of transition stripes per burst, which can be used in error detection and correction.

The head assembly 24 comprises a plurality of read and/or write elements 28 configured to read and/or write data on a magnetic tape with respect to sets of the longitudinal data tracks 29. In the example of FIG. 1, a head assembly 24 comprises at least two narrow servo read elements 25, 26, allowing two servo bands to be sensed simultaneously. The resulting outputs from both servo bands may be averaged or used redundantly to reduce error rates. When the servo read elements 25, 26 are properly positioned at the defined servo bands 27, the read and write elements 28 are properly positioned to transfer data with respect to the data track location of the magnetic tape 20.

Those skilled in the art will recognize that the dark slanted stripes represent magnetized areas of recorded magnetic flux that extend across the width of a servo track 27, and that the edges of the stripes comprise flux transitions that are detected to generate a servo read element signal. The transitions have two magnetic polarities, on each edge of a stripe. When a servo read element crosses a transition of servo track 27, e.g. along servo track centerline 50 of FIG. 2, it produces an analog signal pulse whose polarity is determined by the polarity of the transition. For example, the servo read element may produce positive pulses on the leading edge of each stripe (on encountering the transition of encountering the stripe), and negative pulses on the trailing edge (on encountering the transition on leaving the stripe). To reduce the chance for error, the servo system times only intervals between magnetic flux transitions having the same polarity. As one example, only transition pulses generated by the servo read element in moving across the leading edge of a stripe are used, and transition pulses generated by moving across the trailing edge of a stripe are ignored. Hence, herein, the term "transition" refers to edges of stripes, or equivalent, that result in the generation of signals having the same polarity.

The lateral positioning of the servo read element with respect to the timing based servo track is sensed based on a measure of time between two transitions having different slants, called the "A" distance, as compared to the time between two transitions having parallel slants, called the "B" distance. Referring to FIG. 1 for example, the "A" distance may be measured based on the time between the first transition stripe of burst 40 and the first transition stripe of burst 41. Further, in one example, the "B" distance is measured based on the time between the first transition stripe of burst 40 and the first transition stripe of burst 42. One of ordinary skill in the art would understand that while in the above example the first transition stripe of each burst is used to determine the "A" and "B" distance, any transition stripe of the respective burst may be utilized. For example, the "A" and "B" distances may be determined based on the comparison of the second transition stripe of one burst against the second transition stripe of the other burst. The first transition stripe is defined herein as the first transition stripe the servo read element 25, 26 arrives at in the read direction.

More specifically, lateral position sensing within a defined servo band is achieved by deriving a ratio of these two servo pattern intervals. In particular, the lateral position may be the ratio of (1) the distance between transitions of bursts 40 and 41, called the "A" distance, to (2) the distance between transitions of burst 40 and 42, called the "B" distance. The distances are measured by the timing between the transitions at a constant velocity. Thus, as the tape head servo read elements 25, 26 move toward the lower edge of the tape 20, the ratio of the time between the transitions of burst 40 and 41 to the time between the transitions of bursts 40 and 42 becomes greater, since the distance between the "A" transitions of the burst 40 and 41 is greater, while the distance between the "B" transitions of burst 40 and 42 remains unchanged.

It is important to note that the servo tracks 27 are typically generated by a servo writer having two spaced apart write elements of different slants, forming the "A" distance, which are pulsed simultaneously. Thus, the "A" geometric distance is determined photolithographically, and is therefore, independent of the timing or the velocity of the servo writer drive.

The tape is moved longitudinally across the head assembly 24 so that the servo tracks 27*a* and 27*b* are moved across the servo read elements 25 and 26, respectively. When such movement occurs, the servo pattern of magnetic flux transitions is detected by the servo read elements 25 and 26 so that it generates two analog servo read element signals, one for each servo read element 25 and 26. The analog servo read element signals for each servo read element 25 and 26 are provided via a servo signal lines 84 and 90 to signal decoders 86 and 92, respectively. The respective signal decoders then process the servo read element signals and generate a position signal that is transmitted via position signal lines 88 and 94 to servo controller 80. The servo controller 80 generates a servo control signal and provides it on control line(s) 82 to a servo positioning mechanism at head assembly 24. The servo positioning mechanism responds to the control signal from the servo controller 80 by moving the assembly including servo read elements 25 and 26 laterally with respect to the servo track centerline 50 to reach the desired servo track or to maintain the servo read elements 25 and 26 center with respect to the servo track centerline 50.

Servo detection logic of servo system 80 is configured to detect from the signals supplied on line(s) 82, the relative timings of the laterally extending transitions, specifically including the transitions having different slants, sensed by the plurality of laterally spaced servo read elements 25 and 26 as the magnetic tape 20 is moved in the longitudinal direction. The servo detection logic is configured to determine from the relative timings of the sensed transitions the "A" distances and information regarding the relationship between the plurality of servo read elements 25 and 26 and the magnetic tape for at least one known set of laterally extending transitions having differing slants.

Figure 2:
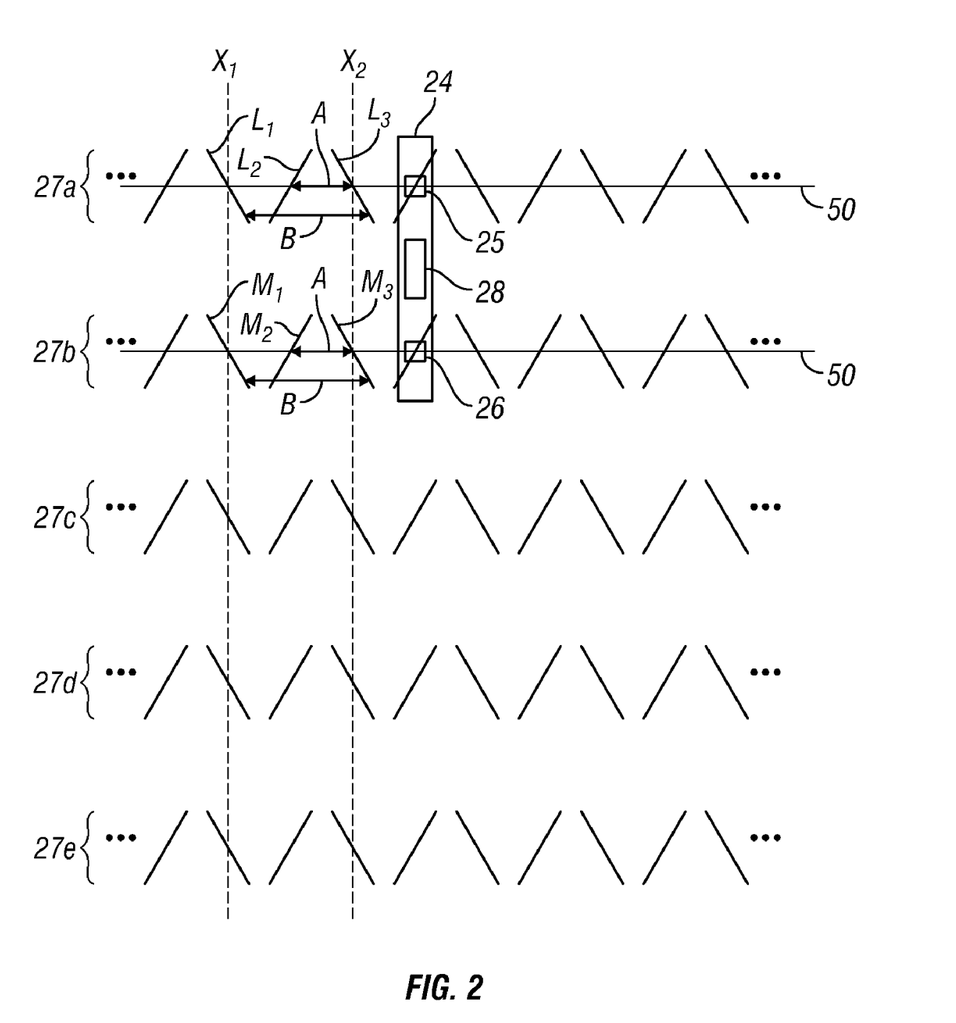
FIG. 2 is a simplified diagrammatic illustration of a magnetic tape having a timing based servo track, and of a magnetic head and servo system of a magnetic tape drive having multiple servo read elements including indication of "A" and "B" signal intervals.

FIG. 2 shows simplified version of a timing based servo pattern on a magnetic tape, such as magnetic tape 20. For purposes of simplifying the illustration each burst is shown in FIG. 2 as a single line. In one embodiment the single line may represent the first transition stripe of each burst.

Similar to that described with respect to FIG. 1, the head assembly 24 comprises at least two narrow servo read elements 25, 26, allowing two servo bands (e.g. 27*a* and 27*b*) to be sensed simultaneously. As mentioned above, when a servo read element (e.g. servo read element 25 and/or 26) crosses a transition of servo track 27, e.g. along servo track centerline 50, it produces an analog signal pulse whose polarity is determined by the polarity of the transition.

In the example illustrated in FIG. 2, transition stripe L2, having a first azimuthal orientation, is separated from transition stripe L3, having a second azimuthal orientation, by distance A. In one example, distance A may be 50 μm. Transition stripe L1, having a second azimuthal orientation, is separated from transition stripe L3, also having a second azimuthal orientation, by distance B. In one example, distance B may be 100 μm ("B" distance).

As illustrated in FIG. 2, in the prior art, each burst of transition stripes within one servo band (e.g. 27*a*) is longitudinally aligned with each burst of transition stripes of all servo bands (e.g. 27*b*, 27*c*, 27*d*, 27*e*). For example, the burst represented by transition stripe L1 of servo band 27*a* aligns longitudinally with the burst represented by transition stripe M1 of servo band 27*b* along x1. Similarly, the bursts represented by transition stripes L2 and L3 align longitudinally with the bursts represented by transition stripes M2 and M3, respectively.

Servo read element 25 (as shown in FIG. 1) measures the "A" distance along servo band 27*a* by detecting a signal as it crosses a transition stripe of a first azimuthal orientation of servo band 27*a* (e.g. transition stripe L2) along servo track centerline 50 and then by detecting a signal as it crosses an adjacent transition stripe of a second azimuthal orientation of servo band 27*a* (e.g. transition stripe L3). Similarly, servo read element 26 measures the "A" distance along servo band 27*b* by detecting a signal as it crosses a transition stripe of a first azimuthal orientation of servo band 27*b* (e.g. transition stripe M2) along servo track centerline 50 and then by detecting a signal as it crosses an adjacent transition stripe of a second azimuthal orientation of servo band 27*b* (e.g. transition stripe M3). Since the transition stripes L3 and M3 align longitudinally along the length of the magnetic tape 20 at x2, the servo read element 25 outputs servo information regarding distance "A" at the same time that servo read element 26 outputs information regarding distance "A". Accordingly, servo information obtained from servo element 26 regarding an odd servo band is provided simultaneously with the servo information obtained from servo element 25 regarding an even servo band.

Furthermore, as illustrated in FIG. 2, servo read element 25 measures the "B" distance along servo band 27*a* by detecting a signal as it crosses a transition stripe of a second azimuthal orientation of servo band 27*a* (e.g. transition stripe L1) along servo track centerline 50 and then by detecting a signal as it crosses an adjacent transition stripe of the second azimuthal orientation of servo band 27*a* (e.g. transition stripe L3). Similarly, servo read element 26 measures the "B" distance along servo band 27*b* by detecting a signal as it crosses a transition stripe of a second azimuthal orientation of servo band 27*b* (e.g. transition stripe M1) along servo track centerline 50 and then by detecting a signal as it crosses an adjacent transition stripe of the first azimuthal orientation of servo band 27*b* (e.g. transition stripe M3). Again, since the transition stripes L3 and M3 align longitudinally along the length of the magnetic tape 20 at x2, the servo read element 25 outputs servo information regarding distance "B" at the same time that servo read element 26 outputs information regarding distance "B". Accordingly, servo information obtained from servo element 26 regarding an odd servo band is provided simultaneously with the servo information obtained from servo element 25 regarding an even servo band.

The sample rate, Fs, of the servo read element signal is determined by the length of the servo pattern and the tape velocity. The sampling rate, Fs may be expressed as:

$$Fs = \frac{\text{velocity}}{\text{distance}}$$

wherein the velocity is the velocity of the magnetic tape and the distance is the distance between two transition lines of the servo pattern.

For example, assuming a tape velocity of 2 m/sec, a distance "A" of 50 μm, and a distance "B" of 100 μm, the servo read elements 25 and 26 would output servo information at a rate of 20,000 samples every second.

The sample rate required for proper servoing is determined by the rest of the components of the track-following servo loop. In order to support a high bandwidth track following the servo control system requires a high sampling rate servo feedback signal. The high sampling rate provides up-to-date, accurate information of the servo read element position, and therefore, supports a higher servo bandwidth and thus a much better controlled servo system. As the magnetic tape 20 velocity slows to match with the slower data transfer host system (referred to as speed matching) the sampling rate becomes slower and results in too slow of a sampling rate to maintain high bandwidth track following system.

Thus, what is presented is a method and a system that is configured to detect a servo pattern with a higher longitudinal density of servo information such that a higher servo sampling rate is realized. The higher sampling rate provides up-to-date accurate information of servo read element position and, therefore, ensures a higher servo bandwidth system with increased control.

In accordance with the present disclosure FIG. 3 describes a timing based servo pattern on a magnetic tape, such as magnetic tape 320 wherein prerecorded magnetic parallel longitudinal servo tracks 327a, 327b, 327c, 327d, and 327e (also referred to herein as 327) lie between groups of longitudinal data tracks 329a, 329b, 329c, 329d, and 329e (herein after referred to as 329). In addition, the prerecorded magnetic parallel servo tracks or bands comprise odd servo bands and even servo bands. The odd servo bands lie between each of the even servo bands. For example, servo bands 327a, 327c and 327e may be defined as even servo bands and servo bands 327b, and 327d may be defined as odd servo bands.

The magnetic tape 320 is also provided with guard bands 348, 349 at the edges of the tape. The longitudinal direction is defined as the direction along the length of the magnetic tape 320. The lateral direction is defined as the direction along the width of the magnetic tape 320 and is perpendicular to the longitudinal direction.

Figure 3:
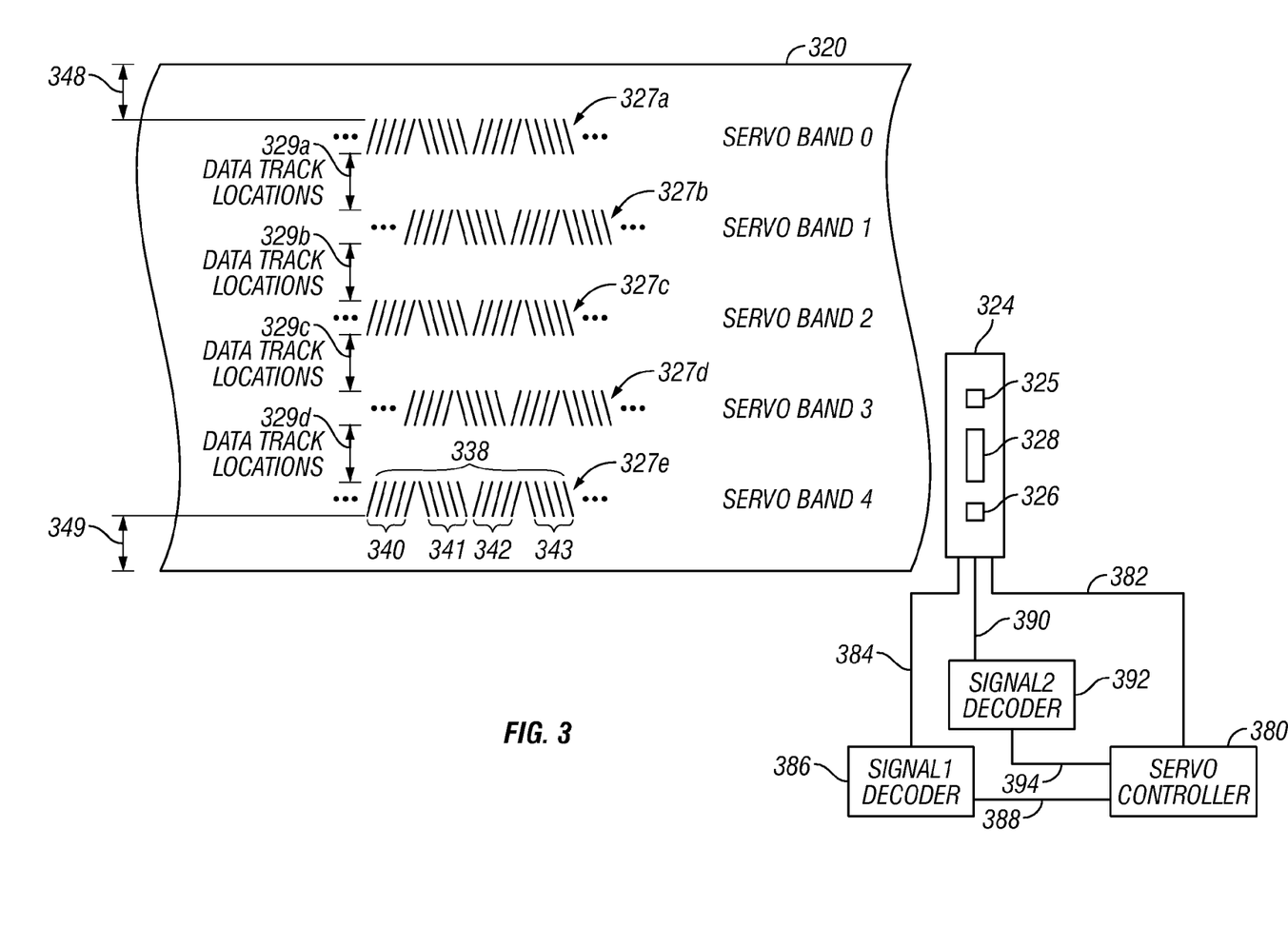
FIG. 3 an embodiment in accordance with the present disclosure of a diagrammatic illustration of a magnetic tape having a timing based servo track, and of a magnetic head and servo system of a magnetic tape drive having multiple servo read elements.

In the example of FIG. 3, five longitudinal timing based defined servo bands 327 are prerecorded on a magnetic tape 320 for track following at these positions. The pattern of magnetic transitions recorded in the defined servo bands is a repeated set of frames 338, each of which are of different azimuthal orientations. For example, the pattern may comprise transitions slanted, or having an azimuthal orientation, in a first direction with respect to the longitudinal direction of the linear servo track, alternating with transitions having different slants, for example, in the opposite direction. The groups of transitions having the same azimuthal orientation and separated by gaps or spaced are referred to as "servo bursts" or simply as "bursts" (e.g. bursts 340, 341, 342, and 343). Each servo burst contains a predetermined number of transition stripes per burst, which can be used in error detection and correction. As shown in FIG. 3, the present embodiment comprises a first burst of a group of five stripes in a first azimuthal orientation and a second burst of a group of five transitions in a second azimuthal orientation different than the first azimuthal orientation, followed by a third burst of a group of four transition stripes in the first azimuthal orientation and a fourth burst a group of four transition stripes in the second azimuthal orientation.

The head assembly 324 comprises a plurality of read and/or write elements 328 configured to read and/or write data on a magnetic tape with respect to sets of the longitudinal data tracks 329. When the servo read elements 325, 326 are properly positioned at the defined servo bands 327, the read and write elements 328 are properly positioned to transfer data with respect to the data track location of the magnetic tape 320.

The lateral positioning of the servo read element with respect to the timing based servo track is sensed based on a measure of time between two transitions having different slants, called the "A" distance, as compared to the time between two transitions having parallel slants, called the "B" distance. Referring to FIG. 3 for example, the "A" distance may be measured based on the time between the first transition stripe of burst 340 and the first transition stripe of burst 341. Further, in one example, the "B" distance is measured based on the time between the first transition stripe of burst 340 and the first transition stripe of burst 342. One of ordinary skill in the art would understand that while in the above example the first transition stripe of each burst is used to determine the "A" and "B" distance, any transition stripe of the respective burst may be utilized. For example, the "A" and "B" distances may be determined based on the comparison of the second transition stripe of one burst against the second transition stripe of the other burst.

More generally, lateral position sensing within a defined servo band is achieved by deriving a ratio of these two servo pattern intervals. Specifically, the lateral position may be the ratio of (1) the distance between transitions of bursts 340 and 341, called the "A" distance, to (2) the distance between transitions of burst 340 and 342, called the "B" distance. The distances are measured by the timing between the transitions at a constant velocity. Thus, as the tape head servo read elements 325, 326 move toward the lower edge of the magnetic tape 320, the ratio of the time between the transitions of burst 340 and 341 to the time between the transitions of bursts 340 and 342 becomes greater, since the distance between the "A" transitions of the burst 340 and 341 is greater, while the distance between the "B" transitions of burst 340 and 342 remains unchanged.

As illustrated in FIG. 3, each burst of transition stripes within the odd servo bands (e.g. 327b and 327d) is longitudinally shifted or is offset from each burst of transition stripes of the even servo bands (e.g. 327a, 327c, and 327e) such that the servo information of said odd servo bands is interleaved with the servo information from the even servo bands.

Figure 4:
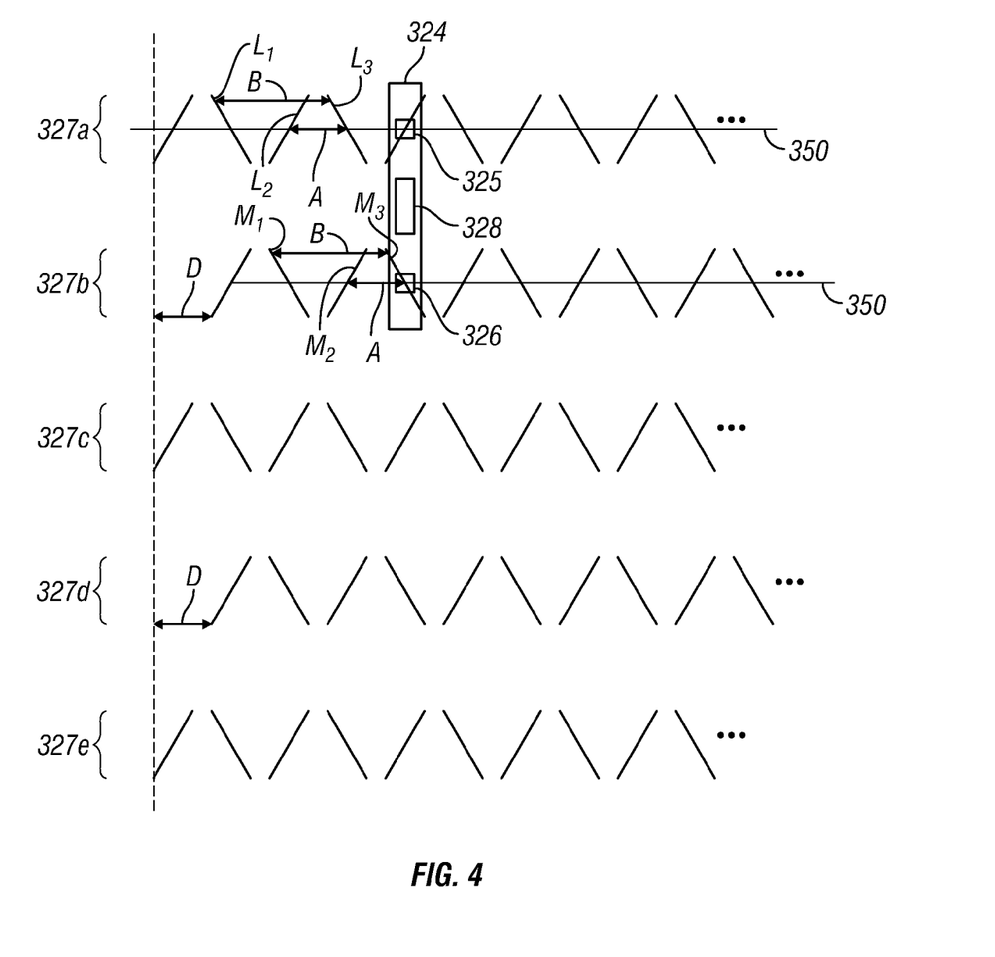
FIG. 4 is an embodiment in accordance with the present disclosure of a simplified diagrammatic illustration of a magnetic tape having a timing based servo track, and of a magnetic head and servo system of a magnetic tape drive having multiple servo read elements including indication of "A" and "B" signal intervals.

FIG. 4 shows simplified version of a timing based servo pattern on a magnetic tape, such as magnetic tape 320. For purposes of simplifying the illustration each burst is shown in FIG. 4 as a single line. In one embodiment the single line may represent the first transition stripe of each burst.

Similar to that described with respect to FIG. 3, the head assembly 324 comprises at least two narrow servo read elements 325, 326, allowing two servo bands (e.g. 327a and 327b) to be sensed simultaneously. As mentioned above, when a servo read element (e.g. servo read element 325 and/or 326) crosses a transition of servo track 327, e.g. along servo track centerline 350, it produces an analog signal pulse whose polarity is determined by the polarity of the transition.

In the example illustrated in FIG. 4 transition stripe L2, having a first azimuthal orientation, is separated from transition stripe L3, having a second azimuthal orientation, by distance "A". In one example, distance "A" may be 50 μm. Transition stripe L1, having a second azimuthal orientation, is separated from transition stripe L3, also having a second azimuthal orientation, by distance "B". In one example, distance "B" may be 100 μm.

As illustrated in FIG. 4, each burst of transition stripes within the odd servo bands (e.g. 327b and 327d) is longitudinally shifted or is offset from each burst of transition stripes of the even servo bands (e.g. 327a, 327c, and 327e). For example, the burst represented by transition stripe M1 of servo band 327b is longitudinally shifted from the burst represented by transition stripe L1 of servo band 327a by a distance "D". Similarly, the bursts represented by transition stripe L2 and L3 are longitudinally shifted from the bursts represented by transition stripe M2 and M3 by a distance "D", respectively. It should be understood by one of ordinary skill in the art, that while not labeled, 327c and 327e contain L1, L2, and L3. As shown in FIG. 4 transitions L1, L2, and L3 of 327c and 327e align with L1, L2, and L3 of 327a, respectively. Similarly, 327d contains M1, M2, and M3. As shown in FIG. 4 transitions M1, M2, and M3 of 327d align with M1, M2 and M3 of 327b, respectively.

Servo read element 325 measures the "A" distance along servo band 327a by detecting a signal as it crosses a transition stripe of a first azimuthal orientation of servo band 327a (e.g. transition stripe L2) along servo track centerline 350 and then by detecting a signal as it crosses an adjacent transition stripe of a second azimuthal orientation of servo band 327a (e.g. transition stripe L3). Similarly, servo read element 326 measures the "A" along servo band 327b by detecting a signal as it crosses a transition stripe of a first azimuthal orientation of servo band 327b (e.g. transition stripe M2) along servo track centerline 350 and then by detecting a signal as it crosses an adjacent transition stripe of a second azimuthal orientation of servo band 327b (e.g. transition stripe M3). Since the transition stripes L3 and M3 are longitudinally shifted from each other by a distance "D", the servo read element 325 outputs servo information regarding distance "A" at a different time than when servo read element 326 outputs information regarding distance "A" such that the servo information of the odd servo bands is interleaved with the servo information from the even servo bands. Accordingly, servo information obtained from servo element 326 regarding an odd servo band is not provided simultaneously with the servo information obtained from servo element 325 regarding an even servo band.

Furthermore, as illustrated in FIG. 4, servo read element 325 measures the "B" distance along servo band 327a by detecting a signal as it crosses a transition stripe of a second azimuthal orientation of servo band 327a (e.g. transition stripe L1) along servo track centerline 350 and then by detecting a signal as it crosses an adjacent transition stripe of the second azimuthal orientation of servo band 327a (e.g. transition stripe L3). Similarly, servo read element 326 measures the "B" distance along servo band 327b by detecting a signal as it crosses a transition stripe of a second azimuthal orientation of servo band 327b (e.g. transition stripe M1) along servo track centerline 350 and then by detecting a signal as it crosses an adjacent transition stripe of the second azimuthal orientation of servo band 327b (e.g. transition stripe M3). Again, since the transition stripes L3 and M3 are longitudinally shifted by a distance "D" the servo read element 325 outputs servo information regarding distance "B" at a time different than when the servo read element 326 outputs information regarding distance "B". Accordingly, servo information obtained from servo element 326 regarding an odd servo band is not provided simultaneously with the servo information obtained from servo element 325 regarding an even servo band.

Distance "D" may be expressed by the following equation, wherein X is the number of laterally spaced servo read elements of magnetic tape drive:

$$\left[\frac{1}{X} - .1\left(\frac{1}{X}\right)\right]B \leq D \leq \left[\frac{1}{X} + .1\left(\frac{1}{X}\right)\right]B \quad \text{(Equation 1)}$$

wherein X is the number of laterally spaced servo read elements of a magnetic tape drive configured to read and/or write to magnetic tape 320. Equation 1 may be simplified as follows:

$$0.9\frac{B}{X} \leq D \leq 1.1\frac{B}{X}. \quad \text{(Equation 2)}$$

In one embodiment, tape 320 is to be utilized in a magnetic tape drive having two laterally spaced apart servo read elements 325, 326. In this embodiment the first transition stripe of each burst of each odd servo band is longitudinally shifted from the first transition stripe of each burst of each even servo band by a substantially equal distance "D", wherein D is between 0.45B and 0.55B. In a further embodiment the distance "D" is approximately 0.50B. Therefore, in the embodiment in which two servo read elements read two different servo bands (e.g. 327a and 327b) the head assembly 324 will output servo information for the even servo band 327a at a different time than that of any adjacent servo band (e.g. odd servo band 327b). Similarly, servo read element 325 will output servo information for the odd servo band 327b at a different time than that of any adjacent servo bands (e.g. 327a and 327c). Therefore, each burst of transition stripes within the odd servo bands (e.g. 327b and 327d) is longitudinally shifted or is offset from each burst of transition stripes of the even servo bands (e.g. 327a, 327c, and 327e) such that the servo information of said odd servo bands is interleaved with the servo information from the even servo bands. The above described pattern provides a sampling rate that is doubled over the prior art pattern.

For example, in the present embodiment, assuming a tape velocity of 2 m/sec, a distance "A" of 50 μm, and a distance "B" of 100 μm, the servo read elements 325 and 326, would output servo information at a rate of 40,000 samples every second because the odd servo band pattern is shifted longitudinally shifted from the even servo pattern by a distance of "D", wherein 0.45B≦D≦0.55B.

Returning to FIG. 3, the tape is moved longitudinally across the head assembly 324 so that the servo tracks 327a and 327b are moved across the servo read elements 325 and 326, respectively. When such movement occurs, the servo pattern of magnetic flux transitions is detected by the servo read elements 325 and 326 so that it generates two analog servo read element signals, one for each servo read elements 325 and 326. As described above, in the present embodiment the first transition stripe of each burst of each odd servo band (e.g. 327b) is longitudinally shifted from the first transition stripe of each burst of said even servo band (327a) by a substantially equal distance, "D", such that servo information of the odd servo band (327b) is interleaved with said servo information from the even servo band (327a). The analog servo read element signals for each servo read elements 325 and 326 are provided via a servo signal lines 384 and 390 to signal decoders 386 and 392, respectively. Because of the longitudinal shift the servo signals for the even servo band (327a) and odd servo band (327b) are generated at different times and the respective signal decoders process the servo read element signals separately and generate a position signal that is transmitted via position signal lines 388 and 394 to servo controller 380. The servo controller 380 generates a servo control signal for each servo band (e.g. 327a and 327b) and provides it on control line(s) 382 to a servo positioning mechanism at head assembly 324. The servo positioning mechanism responds to the control signal from the servo controller 380 by moving the assembly including servo read elements 325 and 326 laterally with respect to the servo track centerline 350 for each servo band respectively (e.g. 327a and 327b) to reach the desired servo track or to maintain the servo read elements 325 and 326 center with respect to the servo track centerline 350.

Servo detection logic of servo system 380 is configured to detect from the signals supplied on line(s) 382, the relative timings of the laterally extending transitions, specifically including the transitions having different slants, sensed by the plurality of laterally spaced servo read elements 325 and 326 as the magnetic tape 320 is moved in the longitudinal direction. The servo detection logic is configured to determine from the relative timings of the sensed transitions the "A" distances and information regarding the relationship between the plurality of servo read elements 325 and 326 and the magnetic tape for at least one known set of laterally extending transitions having differing slants.

Figure 5:
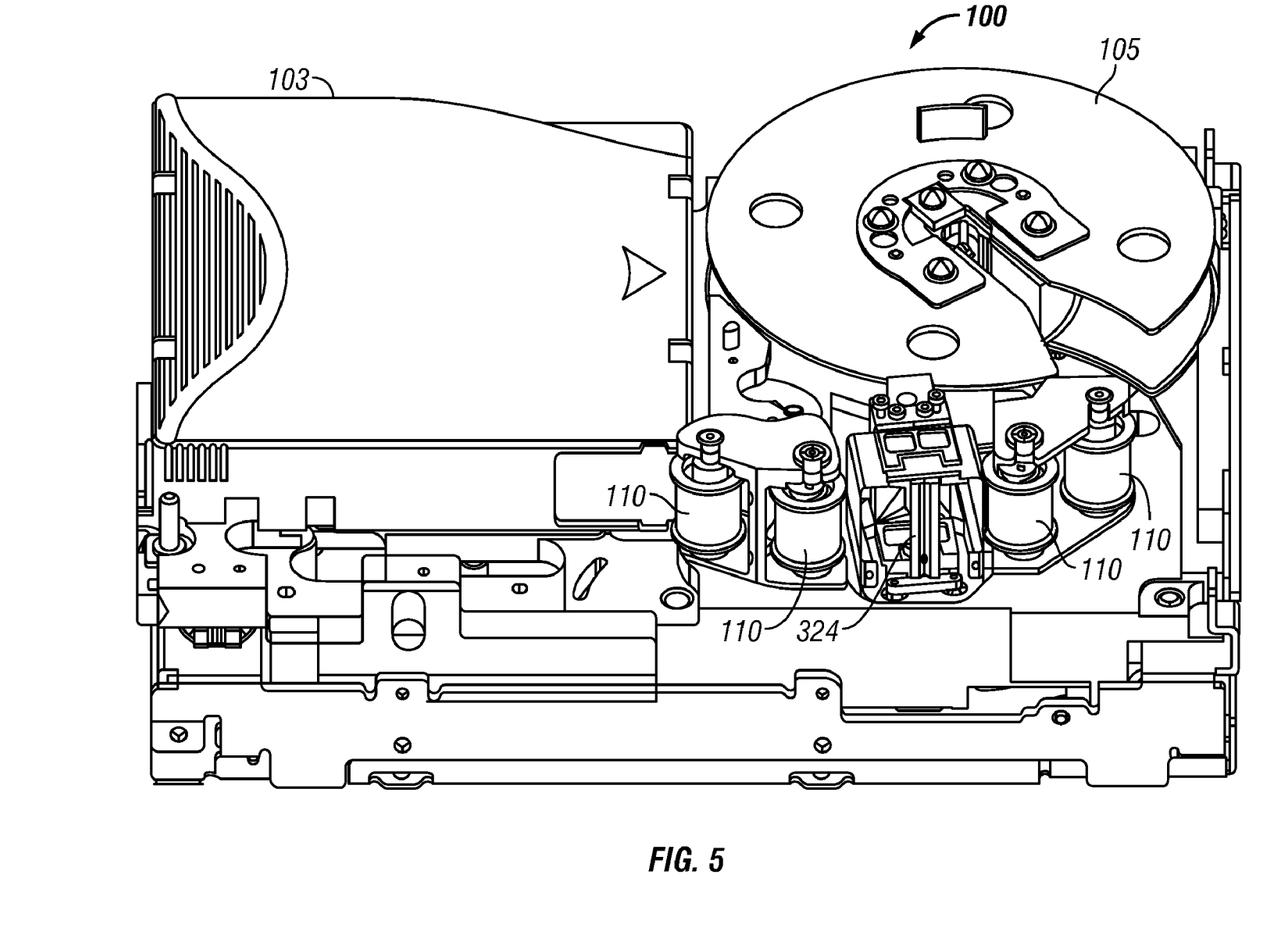
FIG. 5 is an illustration of a magnetic tape drive in accordance with the present disclosure.
Figure 6:
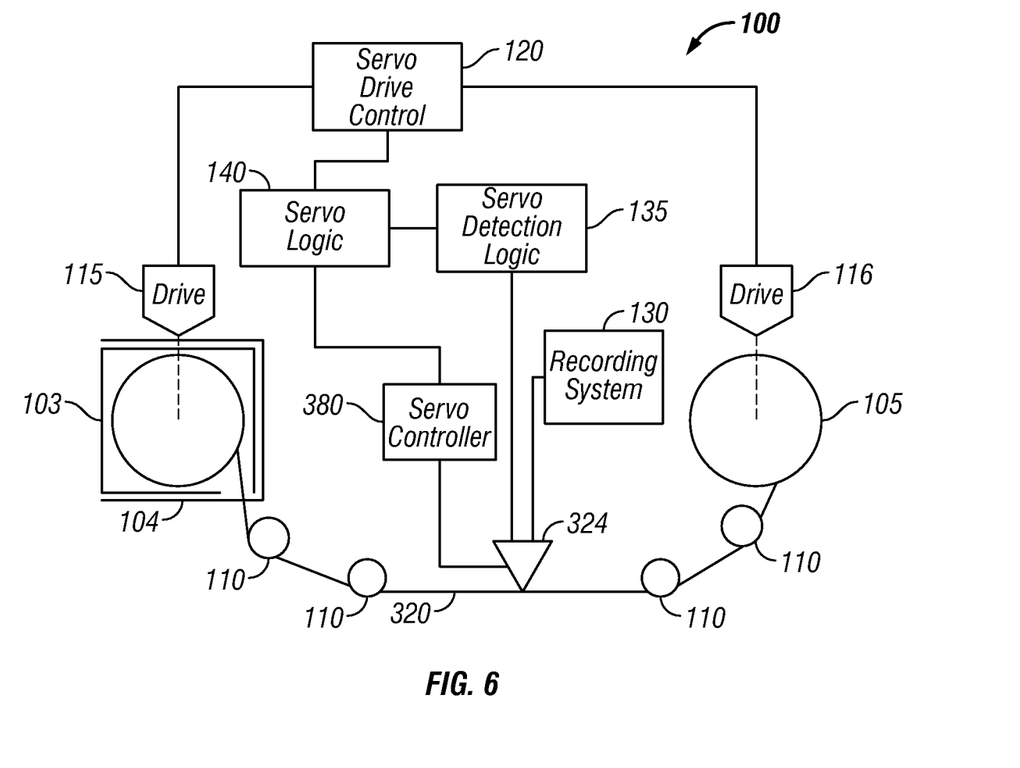
FIG. 6 is block diagrammatic illustration of the magnetic tape drive in accordance with the present disclosure.

A magnetic tape drive 100 is illustrated in FIGS. 5 and 6 and is configured to read and/or write data to a magnetic tape 320, for example, from a magnetic tape cartridge 103. The magnetic tape drive 100 is configured to receive the magnetic tape cartridge 103, and the magnetic tape 320 is guided along a tape path from the magnetic tape cartridge, past a head assembly 324, to a take up reel 105. The magnetic tape 320 may be guided by tape guide rollers 110 along the tape path and constrained laterally by the tape guide rollers as the magnetic tape is moved longitudinally between the magnetic tape cartridge 103 and the take up reel 105, for example, by a drive system comprising drive motors 115 and 116 and a servo drive control 120.

Although the magnetic tape is constrained laterally by the tape guide rollers 110, some minor lateral movement may still occur at the head assembly 324. Further, the magnetic tracks may have some minor lateral movement on the magnetic tape. A servo controller 380 is configured to move the head assembly 324, comprising the servo read elements 325 and 326 and read and/or write heads 328 of FIGS. 3 and 4, laterally with respect to the magnetic tape 320 in accordance with the information relating to the lateral position, discussed above, for example, to track follow the servo tracks of the magnetic tape 320. A recording system 130 operates the read and/or write heads to read and/or write data with respect to the magnetic tape 320 as the magnetic tape is moved longitudinally by the drive system 115, 116, 120 of FIG. 6.

The servo drive control 120 is configured to operate the drive motors 115 and 116 to maintain the longitudinal movement of the magnetic tape 320 relatively constant as the magnetic tape is unwound from one reel and wound onto the other reel, with the radius of the tape on each reel constantly changes.

The servoing of the magnetic tape head assembly 324 and of the drive 115 and 116 motors is accomplished by employing a timing based servo as discussed above. In one example, the servo system is configured to control the lateral position of the read and/or write heads 328 with respect to the magnetic tape 320, and employs a plurality of servo read elements 325 and 326 of FIGS. 3 and 4 that are laterally spaced over a distance less than the lateral width of the laterally extending transitions of servo track 327. Servo detection logic 135 of FIG. 6 is configured to detect the relative timings of the laterally extending transitions sensed by the laterally spaced servo read elements as the magnetic tape is moved in the longitudinal direction. Servo logic 140 is configured to determine from the relative timings of the transitions for at least one known set of laterally extending transitions having differing slants, information relating to the lateral position of at least one of the plurality of servo read elements with respect to the magnetic tape, employing the difference between the relative timing detected from one servo read element and the relative timing detected from another servo read element as discussed above. Servo controller 380 is configured to move the servo read elements and the read and/or write heads in the lateral direction of the magnetic tape in accordance with the information relating to the lateral position.

As discussed above, a high sampling rate provides up-to-date, accurate information of the servo read head element position, and therefore, supports a higher servo bandwidth and thus a much better controlled servo system. As the velocity of the magnetic tape 320 slows to match with the slower data transfer host system (referred to as speed matching) the sampling rate becomes slower and results in too slow of a sampling rate to maintain high bandwidth system track following system. The present embodiment mitigates the slow sampling rate by switching between the servo information from servo read element 325 reading an even servo band (e.g. servo band 327a) and the servo information from servo read element 326 reading odd servo band (e.g. servo band 327b).

Since the transition stripes are longitudinally shifted from each other by a distance "D", the servo read element 325 outputs servo information regarding distance "A" at a different time than when servo read element 326 outputs information regarding distance "A". Similarly, the servo read element 325 outputs servo information regarding distance "B" at a different time than when servo read element 326 outputs information regarding distance "B". Accordingly, servo information obtained from servo element 326 regarding an odd servo band is not provided simultaneously with the servo information obtained from servo element 325 regarding an even servo band. Therefore, the servo information of the odd servo bands is interleaved with the servo information from the even servo bands. In one embodiment in which two servo read elements read two different servo bands (e.g. 327a and 327b) the distance "D" is between 0.45B and 0.055B. In a further embodiment the distance "D" is 0.50B. The above described pattern provides a sampling rate that is doubled over the prior art pattern.

For example, assuming a tape velocity of 2 m/sec, a distance "A" of 50 μm, and a distance "B" of 100 μm, the servo read elements 325 and 326 would output servo information every 20,000 samples every second. However in the current embodiment, assuming the same system parameters of a tape velocity of 2 m/sec, a distance "A" of 50 μm, and a distance "B" of 100 μm, the servo read elements 325 and 326 would output servo information at a rate of 40,000 samples every second since the odd servo band pattern is shifted longitudinally shifted from the even servo pattern by a distance of "D", wherein $0.45B \leq D \leq 0.55B$.

Accordingly, servo controller 380 is configured to move the head assembly 324, comprising the servo read elements 325 and 326 and read and/or write heads 328 of FIGS. 3 and 4, laterally with respect to the magnetic tape 320 in accordance with the information relating to the lateral position of one servo read element (e.g. 325 reading an even servo band 327a) to track follow the servo tracks of the magnetic tape.

Servo detection logic 135 of FIG. 6 is configured to detect the relative timings of at least two laterally extending transitions sensed by the laterally spaced servo read element (e.g. servo read element 325 reading even servo band 327a) at a first time as the magnetic tape is moved in the longitudinal direction. Servo logic 140 is configured to determine from the relative timings of the transitions for at least one known set of laterally extending transitions having differing slants, information relating to the lateral position of servo read element (e.g. servo read element 325 reading even servo band 327a) with respect to the magnetic tape. Servo controller 380 is configured to move the servo read elements and the read and/or write heads in the lateral direction of the magnetic tape in accordance with the information relating to the lateral position from servo read element 325.

The servo controller 380 is then configured to then move the head assembly 324, comprising the servo read elements 325 and 326 and read and/or write heads 328 of FIGS. 3 and 4, laterally with respect to the magnetic tape 320 in accordance with the information relating to the lateral position, of the other servo read element (e.g. 326 reading an odd servo band 327b).

Servo detection logic 135 of FIG. 6 is configured to detect the relative timings of at least two laterally extending transitions sensed by the laterally spaced servo read element (e.g. servo read element 326 reading odd servo band 327b) at a second time as the magnetic tape is moved in the longitudinal direction. The time delay between the first time and the second time corresponds to distance D. In one embodiment the time delay between the first time and the second time is the product of distance D and the velocity of the magnetic tape 320.

Servo logic 140 is configured to determine from the relative timings of the transitions for at least one known set of laterally extending transitions having differing slants, information relating to the lateral position of servo read element (e.g. servo read element 326 reading odd servo band 327a) with respect to the magnetic tape. Servo controller 380 is configured to move the servo read elements and the read and/or write heads in the lateral direction of the magnetic tape in accordance with the information relating to the lateral position from servo read element 326.

While it has been described to utilize the servo information from the even servo band to determine the lateral position of the servo read elements and the read and/or write heads and then to utilize the servo information from the odd band to determine the lateral position of the servo read elements and the read and/or write heads, one of ordinary skill in the art would understand that the servo information may be provided from the odd and even servo band in an alternate order. For example, the servo information from the odd servo band may be utilized to determine the lateral position of the servo read elements and the read and/or write heads, followed by utilizing servo information from the even servo bands to determine the lateral position of the servo read elements and the read and/or write heads.

While the above described embodiment discusses a head assembly comprising two servo read elements, a head assembly may comprise any number of servo elements. For example, in another embodiment, the head assembly 324 comprises three servo read elements. Accordingly, each burst of transition stripes within one servo band is shifted or is offset a substantially equal distance "D" from the burst of transition stripes of the previous servo band. In one embodiment, in which three servo read elements are utilized the distance "D" is between 0.30B and 0.37B as described by Equation 2. In a further embodiment, the distance "D" is approximately 0.33B.

For example, each burst of transition stripes of servo band 327b will be shifted longitudinally a distance "D" of approximately 0.33B from each burst of transition stripes of servo band 327a. Similarly, each burst of transition stripes of servo band 327c will be shifted longitudinally a distance "D" of approximately 0.33B from each burst of transition stripes of servo band 327b. Further, each burst of transition stripes of servo band 327d will be shifted longitudinally a distance "D" of approximately 0.33B from each burst of transition stripes of servo band 327c such that the transition stripes of servo band 327d is aligned with the transition stripes of servo band 327a. Finally, each burst of transition stripes of servo band 327e will be shifted longitudinally a distance "D" approximately 0.33B from each burst of transition stripes of servo band 327d such that the transition stripes of servo band 327e is aligned with the transition stripes of servo band 327b.

Similar to that discussed above with respect to FIGS. 3 and 4, since the transition stripes are longitudinally shifted from each other by a distance "D", each of the servo read elements output servo information regarding distances "A" and "B" at a different time than any adjacent servo band. For example, in the embodiment in which three servo read elements read three different servo bands (e.g. 327a, 327b, and 327c) the head assembly 324 (with three servo heads, not shown) will output servo information for servo band 327b at a different time than that any adjacent servo band (e.g. 327a and 327c) such that the servo information of said odd servo bands is interleaved with the servo information from the even servo bands, and specifically, that the servo information of a servo band is interleaved with the servo information from any adjacent servo band. The above described pattern provides a sampling rate that is tripled over the prior art pattern.

For example, in the present embodiment, assuming a tape velocity of 2 m/sec, a distance "A" of 50 μm, and a distance "B" of 100 μm, the servo read elements 325 and 326, would output servo information at a rate of 60,000 samples every second since each burst of transition stripes within one servo band is shifted or is offset a substantially equal distance "D" from the burst of transition stripes of the previous servo band, wherein $0.30B \leqq D \leqq 0.37B$.

It should be understood by one of ordinary skill in the art that while the above description describes magnetic transition stripes recorded on magnetic tape, it should be understood that the servo bands 327 may comprise any of several types of longitudinal servo patterns as is known to those of skill in the art.

While the present embodiment describes servo bands 327a, 327c, and 327e as even servo bands and 327b, and 327d as odd servo bands, it should be understood by one of ordinary skill in the art that 327a, 327c, and 327e may be defined as odd servo bands and 327b, and 327d may be defined as even servo bands. Rather, it is only important that each burst of transition stripes within one servo band (is longitudinally shifted or is offset from each burst of transition stripes of any adjacent servo band by a substantially equal distance, "D".

Further, while the present disclosure describes a magnetic tape 320 having five servo bands and four data bands, the present disclosure may be practiced on any magnetic tape having a plurality of servo bands.

The logic discussed above may comprise any suitable logic arrangement known to those of skill in the art. Further, those of skill in the art will understand that differing specific component arrangements may be employed than those illustrated herein.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A magnetic tape drive comprising:
a head assembly comprising a plurality of servo read elements including at least a first and a second servo read element configured to detect transition stripes of a servo pattern on magnetic tape media,
wherein said servo pattern comprises:
a plurality of parallel longitudinal servo bands that lie between a plurality of longitudinal data bands;
said plurality of servo bands comprise odd servo bands and even servo bands, wherein each of said odd servo bands lie between said each of said even servo bands;
each servo band comprising a plurality of frames, wherein each frame comprises a plurality of bursts of transition stripes, each burst having a first transition stripe;
said first transition stripe of each burst of each said odd servo band is longitudinally shifted from said first transition stripe of each burst of each said even servo band by a substantially equal distance, D, such that servo information of said odd servo bands is interleaved with servo information from said even servo bands;
said first servo read element is configured to detect at least two transition stripes of said even servo band on said magnetic tape media at a first time;
servo detection logic configured to detect a timing of said at least two transition stripes of said even servo band on said magnetic tape media;
servo controller configured to position said head assembly laterally with respect to said magnetic tape media in response to said timing of said at least two transition stripes of said even servo band on said magnetic tape media;
said second servo read element configured to detect at least two transition stripes of said odd servo band on said magnetic tape media at a second time, wherein said second time is a time delay after said first time corresponding to said distance D;
said servo detection logic further configured to detect a timing of said at least two transition stripes of said odd servo band on said magnetic tape media; and
said servo controller further configured to position said head assembly laterally with respect to said magnetic tape media in response to said timing of said at least two transition stripes of said odd servo band on said magnetic tape media.

2. The magnetic tape drive of claim 1, wherein said plurality of read elements are further configured to detect said transition stripes of said servo pattern wherein each frame of said plurality of frames further comprises a first burst of transition stripes in a first azimuthal orientation and a second burst of transition stripes in a second azimuthal orientation different than said first azimuthal orientation, followed by a third burst of transition stripes in said first azimuthal orientation and a fourth burst of transition stripes in said second azimuthal orientation and wherein a distance between said first transition stripe of said first burst and said first transition stripe of said third burst is a distance B.

3. The magnetic tape drive of claim 2, wherein said plurality of servo read elements are configured to detect said transition stripes of said servo pattern wherein said first transition stripe of each burst of each said odd servo band is longitudinally shifted from said first transition stripe of each burst of each said even servo band by said substantially equal distance, D, wherein $$0.9\frac{B}{X} \le D \le 1.1\frac{B}{X}$$

and wherein X is defined as a number of servo read elements of said plurality of servo read elements.

4. The magnetic tape drive of claim 3, wherein said magnetic tape drive comprises two servo read elements such that $0.45B \le D \le 0.55B$.

5. The magnetic tape drive of claim 3, wherein said magnetic tape drive comprises three servo read elements such that $0.30B \le D \le 0.37B$.

6. The magnetic tape drive of claim 2, wherein $0.45B \le D \le 0.55B$.

7. The magnetic tape drive of claim 2, wherein $0.30B \le D \le 0.37B$.

8. The magnetic tape drive of claim 2, wherein D is approximately 0.50B.

9. The magnetic tape drive of claim 2, wherein D is approximately 0.33B.

10. The magnetic tape drive of claim 1, wherein said magnetic tape drive further comprises a drive system configured to move said magnetic tape media longitudinally with respect to said head assembly.

11. The magnetic tape drive of claim 1, wherein said head assembly further comprises a magnetic read/write tape head configured to read and write data on said magnetic tape media.

12. The magnetic tape drive of claim 1, wherein said first and second servo read elements are laterally spaced apart.

13. The magnetic tape drive of claim 1, wherein said time delay is a product of said distance, D, and a velocity of said magnetic tape media.

14. The magnetic tape drive of claim 1, wherein said plurality of read elements are further configured to detect said transition stripes of said servo pattern said frame further comprises a first burst of a group of five stripes in a first azimuthal orientation and a second burst of a group of five transitions in a second azimuthal orientation different than said first azimuthal orientation, followed by a third burst of a group of four transition stripes in said first azimuthal orientation and a fourth burst a group of four transition stripes in said second azimuthal orientation.

15. The magnetic tape drive of claim 1, wherein said second azimuthal orientation is opposite of said first azimuthal orientation.

16. A method comprising:
moving a magnetic tape media longitudinally with respect to a head assembly comprising at least a first and a second servo read element;
detecting transition stripes of a servo pattern on magnetic tape media,
wherein said servo pattern comprises:
a plurality of parallel longitudinal servo bands that lie between a plurality of longitudinal data bands;
said plurality of servo bands comprise odd servo bands and even servo bands, wherein each of said odd servo bands lie between said each of said even servo bands;
each servo band comprising a plurality of frames, wherein each frame comprises a plurality of bursts of transition stripes, each burst having a first transition stripe;
said first transition stripe of each burst of each said odd servo band is longitudinally shifted from said first transition stripe of each burst of each said even servo band by a substantially equal distance, D, such that servo information of said odd servo bands is interleaved with servo information from said even servo bands;

detecting at least two transition stripes of said even servo band on said magnetic tape media at a first time with said first servo read element;

detecting a timing of said at least two transition stripes of said even servo band on said magnetic tape media;

positioning said head assembly laterally with respect to said magnetic tape media in response to said timing of said at least two transition stripes of said even servo band on said magnetic tape media;

detecting at least two transition stripes of said odd servo band on said magnetic tape media at a second time, wherein said second time is a time delay after said first time corresponding to said distance D detecting a timing of said at least two transition stripes of said odd servo band on said magnetic tape media; and positioning said head assembly laterally with respect to said magnetic tape media in response to said timing of said at least two transition stripes of said odd servo band on said magnetic tape media.

17. The method of claim 16, further comprising detecting said transition stripes of said servo pattern wherein each frame of said plurality of frames further comprises a first burst of transition stripes in a first azimuthal orientation and a second burst of transition stripes in a second azimuthal orientation different than said first azimuthal orientation, followed by a third burst of transition stripes in said first azimuthal orientation and a fourth burst of transition stripes in said second azimuthal orientation and wherein a distance between said first transition stripe of said first burst and said first transition stripe of said third burst is a distance B.

18. The method of claim 17, further comprising detecting said transition stripes of said servo pattern wherein said first transition stripe of each burst of each said odd servo band is longitudinally shifted from said first transition stripe of each burst of each said even servo band by said substantially equal distance, D, wherein $$0.9\frac{B}{X} \leq D \leq 1.1\frac{B}{X}$$

and wherein X is defined as a number of servo read elements of said plurality of servo read elements.

19. The method of claim 17, wherein $0.45B \leq D \leq 0.55B$.

20. The method drive of claim 17, wherein $0.30B \leq D \leq 0.37B$.

21. The method of claim 17, wherein D is approximately 0.50B.

22. The method of claim 17, wherein D is approximately 0.33B.

23. The method of claim 16, wherein said time delay is a product of said distance, D, and a velocity of said magnetic tape media.

24. The method of claim 16, further comprising detecting said transition stripes of said servo pattern wherein said frame further comprises a first burst of a group of five stripes in a first azimuthal orientation and a second burst of a group of five transitions in a second azimuthal orientation different than said first azimuthal orientation, followed by a third burst of a group of four transition stripes in said first azimuthal orientation and a fourth burst a group of four transition stripes in said second azimuthal orientation.

25. The method of claim 16, wherein said second azimuthal orientation is opposite of said first azimuthal orientation.

* * * * *